April 25, 1950  H. L. GORDON  2,505,110
ANTIFRICTION BALL BEARING
Filed Sept. 9, 1947
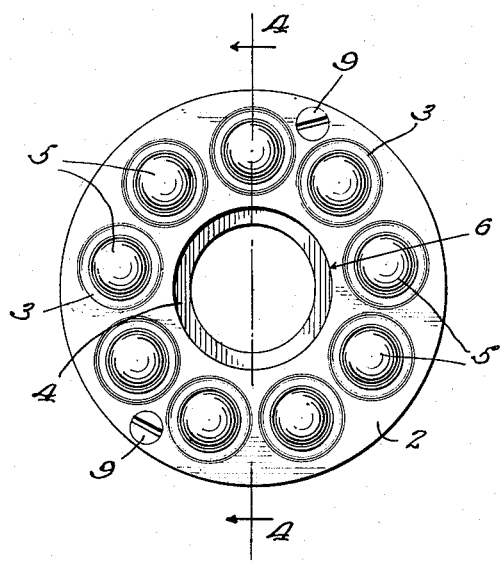
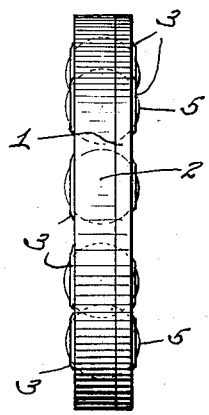
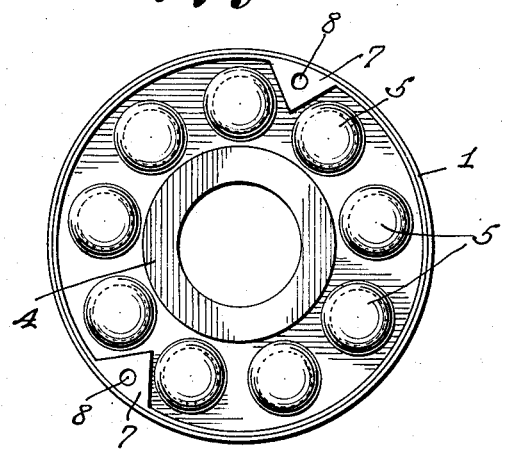
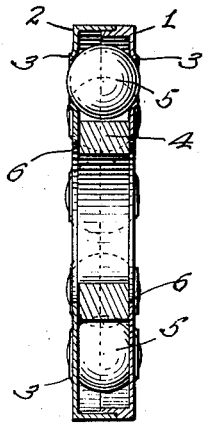
INVENTOR,
Harry L. Gordon.
BY
E. E. Vrooman & Co.,
ATTORNEYS.

Patented Apr. 25, 1950

2,505,110

UNITED STATES PATENT OFFICE 2,505,110

ANTIFRICTION BALL BEARING

Harry L. Gordon, Elmhurst, N. Y.

Application September 9, 1947, Serial No. 772,973

4 Claims. (Cl. 308—235)

This invention relates to an antifriction ball bearing device.

An object of the invention is the production of a comparatively simple but highly-efficient antifriction device, which can be manufactured at a minimum cost.

Another object of the invention is the construction of a simple and efficient ball bearing device that can be used in connection with different type shafts, particularly airplane shafts, and which device is capable of being easily repaired, owing to the ready accessibility of the parts to the operator.

A still further object of the invention is the construction of an antifriction ball bearing device which is provided with a comparatively large, floating, flat spacing ring, whereby the efficiency of the device is greatly increased.

This invention possesses certain improvements of a meritorious nature over the invention disclosed in my companion application, Serial No. 741,564, filed April 15, 1947, and entitled, "Antifriction ball bearing," now matured into Patent No. 2,475,493, July 5, 1949.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Fig. 1 is a top-plan view of a device constructed in accordance with this invention, while Fig. 2 is a view in side elevation.

Fig. 3 is a plan view of the device with the auxiliary section removed.

Fig. 4 is a vertical, sectional view taken on line 4—4, Fig. 1, and looking in the direction of the arrows.

Referring to the drawings, in which the preferred embodiment of this invention is illustrated, 1 designates the primary section and 2 is the auxiliary section. Each section has several outwardly-extending ball-receiving cups 3 formed integrally upon its side.

Loosely mounted between sections 1 and 2 is a large, flat "floating" ring 4, that assists in supporting the balls 5 in their assembled position within the device. The sections 1 and 2 are provided with registering openings 6 which are greater in diameter than the opening in the spacing ring 4, as it will be clearly seen upon referring to Fig. 1. Therefore, the flat ring 4 engages directly the shaft (not shown) when the device is mounted on a shaft, taking the wear off the edge of the openings 6 of the sections 1 and 2. This increases the life of the entire device, as the width of the spacing ring 4 is many times greater than the width of the openings 6.

Within the primary section 1 are two integral, triangular lugs 7; each lug 7 is provided with a threaded socket 8; these sockets 8 receive the screws 9 when the parts of the device are assembled. The advantage of the triangular shape of each lug 7 is that it extends between two contiguous cups 3, as well as two contiguous balls 5, without interfering with the cups and balls, yet giving greater strength to the lug owing to its peculiar formation and length.

From actual experience with a working model of this invention, it has been found that the device is easy to assemble, and is efficient in operation.

When the two sections are secured together (Fig. 4), a very compact and attractive device is produced, with the floating spacing ring 4 in close proximity to the balls 5.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a device of the class described, the combination of a primary and an auxiliary section, each section provided with ball-receiving outwardly extending cups on its side, a single circle of balls within said primary and auxiliary sections and seated in said cups, and a loosely-mounted central ring within said sections and having balls outside of said ring.

2. In a device of the class described, the combination of a primary and an auxiliary section, balls arranged in a single circle and positioned between said primary and auxiliary sections, and a large, flat central spacing ring loosely mounted within said sections and entirely within the circle of balls.

3. In a device of the class described, the combination of a primary and an auxiliary section, said sections provided with registering central openings, a loosely-mounted central ring between said sections and having a central opening of less diameter than said openings of said sections, and a single circle of balls within said sections and around entirely the outer face of said ring.

4. In a device of the class described, the combination of a primary section having inwardly-extending triangular lugs, each lug provided with a threaded socket, balls within said primary section, each lug extending between two contiguous balls, an auxiliary section on said primary section, and screws extending through said auxiliary section and into said threaded sockets of said lugs.

HARRY L. GORDON.

REFERENCES CITED

The following references are of record in the file of this patent:

UNITED STATES PATENTS

| Number | Name | Date |
|---|---|---|
| 1,169,880 | Sorensen | Feb. 1, 1916 |